US011282033B2

(12) United States Patent
Tanabe et al.

(10) Patent No.: US 11,282,033 B2
(45) Date of Patent: Mar. 22, 2022

(54) INTER-COMPANY INFORMATION SHARING SYSTEM AND INTER-COMPANY INFORMATION SHARING METHOD

(71) Applicant: Sony Interactive Entertainment Inc., Tokyo (JP)

(72) Inventors: Taku Tanabe, Tokyo (JP); Kensaku Ishizuka, Tokyo (JP); Naoyuki Miyada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 423 days.

(21) Appl. No.: 16/314,540

(22) PCT Filed: Jul. 5, 2017

(86) PCT No.: PCT/JP2017/024695
§ 371 (c)(1),
(2) Date: Dec. 31, 2018

(87) PCT Pub. No.: WO2018/012375
PCT Pub. Date: Jan. 18, 2018

(65) Prior Publication Data
US 2019/0244173 A1     Aug. 8, 2019

(30) Foreign Application Priority Data

Jul. 13, 2016   (JP) ............................. JP2016-138958

(51) Int. Cl.
*G06Q 10/10*     (2012.01)
*G06F 21/62*     (2013.01)
(Continued)

(52) U.S. Cl.
CPC ............. *G06Q 10/10* (2013.01); *G06F 21/62* (2013.01); *G06F 21/6245* (2013.01);
(Continued)

(58) Field of Classification Search
CPC ..... H04L 63/10; H04L 63/102; H04L 63/105; H04L 63/101; H04L 63/04; H04L 51/14;
(Continued)

(56) References Cited

U.S. PATENT DOCUMENTS 5,335,346 A * 8/1994 Fabbio ................ G06F 21/6218
711/163
9,171,163 B2   10/2015 Phegade
(Continued)

FOREIGN PATENT DOCUMENTS

CN   101894312 A   11/2010
CN   104169940 A   11/2014
(Continued)

OTHER PUBLICATIONS

A. Elkandoussi and H. Elbakkali, "On access control requirements for inter-organizational workflow," Proceedings of the 4th Edition of National Security Days (JNS4), Tetuan, Morocco, 2014, pp. 1-6, doi: 10.1109/JNS4.2014.6850128. (Year: 2014).*

(Continued)

*Primary Examiner* — Dennis Truong
(74) *Attorney, Agent, or Firm* — Matthew B. Dernier, Esq.

(57) ABSTRACT

There is provided an inter-company information sharing system in which a communication connection is made with a plurality of computers individually corresponding to a plurality of companies, including information disclosure request receiving means for receiving an information disclosure request from each of the computers, information registration request receiving means for receiving an information registration request from each of the computers, information storage means for storing information regarding the information registration request, and disclosure control means for controlling a disclosure of the information stored (Continued)

in the information storage means on the basis of information regarding the company corresponding to the computer that has transmitted the information registration request and the information regarding the company corresponding to the computer that has transmitted the information disclosure request.

17 Claims, 4 Drawing Sheets

(51) Int. Cl.

| | | |
|---|---|---|
| *G06Q 10/06* | (2012.01) | |
| *G06Q 10/08* | (2012.01) | |
| *G06Q 50/10* | (2012.01) | |
| *H04L 12/58* | (2006.01) | |
| *H04L 29/06* | (2006.01) | |
| *H04L 51/00* | (2022.01) | |

(52) U.S. Cl.
CPC ............ *G06Q 10/06* (2013.01); *G06Q 10/08* (2013.01); *G06Q 50/10* (2013.01); *H04L 51/14* (2013.01); *H04L 63/04* (2013.01); *H04L 63/10* (2013.01); *H04L 63/101* (2013.01); *H04L 63/102* (2013.01); *H04L 63/105* (2013.01); *G06F 2221/2141* (2013.01)

(58) Field of Classification Search
CPC ........ G06Q 10/10; G06Q 50/10; G06Q 10/06; G06Q 10/08; G06F 21/62; G06F 21/6245; G06F 2221/2141
See application file for complete search history.

(56) References Cited

U.S. PATENT DOCUMENTS

| | | | |
|---|---|---|---|
| 9,762,490 B2* | 9/2017 | Valencia Lopez | .... H04L 63/102 |
| 10,445,520 B2 | 10/2019 | Ciancio-Bunch | |
| 2005/0228987 A1 | 10/2005 | Sachiko | |
| 2008/0127310 A1* | 5/2008 | Robbins | ................ H04L 63/102 |
| | | | 726/4 |
| 2011/0088101 A1* | 4/2011 | Shibata | ................... H04L 51/14 |
| | | | 726/29 |
| 2012/0059906 A1 | 3/2012 | Ciancio-Bunch | |
| 2014/0189356 A1 | 7/2014 | Phegade | |
| 2014/0283098 A1 | 9/2014 | Phegade | |
| 2014/0373104 A1* | 12/2014 | Gaddam | ................ H04L 63/105 |
| | | | 726/4 |
| 2015/0127607 A1* | 5/2015 | Savage | .................. G06F 16/178 |
| | | | 707/610 |
| 2016/0070758 A1* | 3/2016 | Thomson | ................ G16H 10/60 |
| | | | 707/781 |
| 2016/0255089 A1* | 9/2016 | Diestler | .............. G06F 21/6236 |
| | | | 726/4 |
| 2017/0344749 A1* | 11/2017 | Yang | ................... G06F 16/9535 |

FOREIGN PATENT DOCUMENTS

| | | |
|---|---|---|
| CN | 105074719 A | 11/2015 |
| CN | 105450680 A | 3/2016 |
| EP | 2254291 A1 | 11/2010 |
| JP | 2001331686 A | 11/2001 |
| JP | 2004318452 A | 11/2004 |
| JP | 2010108514 A | 5/2010 |
| JP | 2010271953 A | 12/2010 |
| JP | 2012141825 A | 7/2012 |
| JP | 2012519920 A | 8/2012 |
| WO | 2004104879 A1 | 12/2004 |

OTHER PUBLICATIONS

International Search Report for corresponding PCT Application No. PCT/JP2017/024695, 4 pages, dated Oct. 3, 2017.
International Preliminary Report on Patentability and Written Opinion for corresponding PCT Application No. PCT/JP2017/024695, 4 pages, dated Jan. 24, 2019.
Notification of Reasons for Refusal for corresponding JP Application No. 2018-527545, 17 pages, dated Jan. 28, 2020.
Extended European Search Report for corresponding EP Application No. 17827503.8, 8 pages, dated Nov. 18, 2019.
The First Office Action for corresponding CN Application No. 201780041936.0, 20 pages, dated Apr. 26, 2021.
Notice of Allowance for corresponding CN Application No. 201780041936.0, 7 pages, dated Sep. 30, 2021.
Summons to Attend Oral Hearing for corresponding EP Application No. 17827503.8, 11 pages, dated Oct. 13, 2021.
Author unknown, "Bitwise operation" Wikipedia, https://en.wikipedia.org/w/index.php?title=Bitwise_operation&oldid=728568071, 7 pages, Jul. 6, 2016.

\* cited by examiner

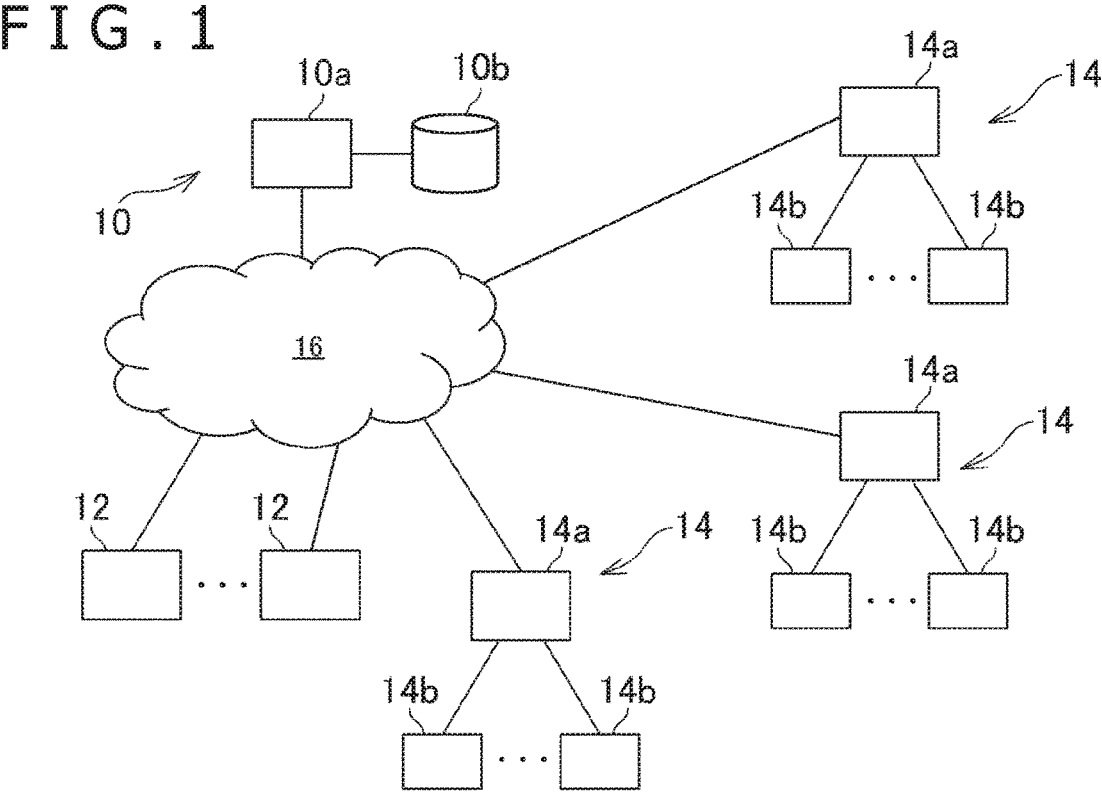

| | |
|---|---|
| DISCLOSURE SOURCE BUSINESS CATEGORY DATA | 0011 |
| | AND |
| DISCLOSURE DESTINATION BUSINESS CATEGORY DATA | 1001 |
| OPERATION RESULT | 0001 (NG) |

| | |
|---|---|
| DISCLOSURE PERMISSION FILTER | 000000001100 |
| | AND |
| COMPANY ID (ID=4) | 000000000100 |
| OPERATION RESULT | 000000000100 (OK) |

| | |
|---|---|
| DISCLOSURE PERMISSION FILTER | 000000001100 |
| | AND |
| COMPANY ID (ID=16) | 000000010000 |
| OPERATION RESULT | 000000000000 (NG) |

FIG.12

| INFORMATION ID | BUSINESS CATEGORY DATA | ABSTRACTION PROCESSING |
|---|---|---|
| 001 | 0011 | A |
| 001 | 0100 | B |
| 001 | 1000 | C |
| 002 | 0001 | A |

FIG.13

| DISCLOSURE SOURCE COMPANY ID | DISCLOSURE DESTINATION COMPANY ID | INFORMATION ID |
|---|---|---|
| 1 | 4 | 001,002 |
| 1 | 8 | 001 |
| 4 | 16 | 003 |

INTER-COMPANY INFORMATION SHARING SYSTEM AND INTER-COMPANY INFORMATION SHARING METHOD

TECHNICAL FIELD

The present invention relates to an inter-company information sharing system, and in particular to, information sharing between companies in a case where manufacturing or transportation is performed in cooperation with a plurality of companies.

BACKGROUND ART

In manufacturing services or transportation services, it is extremely important to manage various pieces of business data such as manufacturing management, schedule control, and transportation state management. Further, plans and performances of each business are made visible by using an information communication system to thereby perform various business improvements.

SUMMARY

Technical Problem

The present inventors have investigated that in a case where manufacturing or transportation is performed in cooperation with a plurality of companies, business data such as plans and performances of business in charge in each company is shared among the companies. It is expected that this manages such a cooperation among companies more effectively by using the shared business data. However, even companies set in a competitive relationship may be included in the plurality of companies. It is thought that in such a case, hesitation may be made in thoroughly disclosing the business data of business in charge to other companies.

The present invention has been made in view of the above circumstances. An object of the present invention is therefore to provide an inter-company information sharing system and inter-company information sharing method that are capable of implementing access control appropriate for information registered by each of the plurality of companies.

Solution to Problem

In solving the above problem and according to one aspect of the present invention, there is provided an inter-company information sharing system in which a communication connection is made with a plurality of computers individually corresponding to a plurality of companies, including information disclosure request receiving means for receiving an information disclosure request from each of the computers, information registration request receiving means for receiving an information registration request from each of the computers, information storage means for storing information regarding the information registration request, and disclosure control means for controlling a disclosure of the information stored in the information storage means on a basis of information regarding the company corresponding to the computer that has transmitted the information registration request and the information regarding the company corresponding to the computer that has transmitted the information disclosure request.

The disclosure control means may control the disclosure of the information on a basis of business category data of the company corresponding to the computer that has transmitted the information registration request and the business category data of the company corresponding to the computer that has transmitted the information disclosure request.

Further, the disclosure control means may control the information disclosure on a basis of data for specifying an object company of the information disclosure for the company corresponding to the computer that has transmitted the information registration request and data for specifying the company corresponding to the computer that has transmitted the information disclosure request.

Further, the data for specifying the object company of the information disclosure may be set in advance in each type of the information.

Further, the disclosure control means may transmit, to the computer that has transmitted the information disclosure request, the information abstracted by a mode corresponding to a type of the information and the business category data of the company corresponding to the computer that has transmitted the information disclosure request.

Further, the inter-company information sharing system may further include the plurality of computers. Each of the computers may include means for transmitting the information registration request including data for identifying the company corresponding to the computer and data for identifying the type of the information.

Further, each of the computers may further include means for transmitting the information disclosure request including the data for identifying the company corresponding to the computer and the data for identifying the type of the information.

Further, according to another aspect of the present invention, there is provided an inter-company information sharing method among a plurality of computers individually corresponding to a plurality of companies, including a step of receiving an information disclosure request from each of the computers, a step of receiving an information registration request from each of the computers, a step of storing information regarding the information registration request in information storage means, and a step of controlling a disclosure of the information stored in the information storage means on a basis of information regarding the company corresponding to the computer that has transmitted the information registration request and the information regarding the company corresponding to the computer that has transmitted the information disclosure request.

According to one mode of the present method, the inter-company information sharing method may further include a step of transmitting the information registration request including data for identifying the company corresponding to the computer from each of the computers and data for identifying a type of the information.

Further, the inter-company information sharing method may further include a step of transmitting the information disclosure request including the data for identifying the company corresponding to the computer from each of the computers and the data for identifying the type of the information.

BRIEF DESCRIPTION OF DRAWINGS

FIG. 1 is the entire configuration diagram of an information system including an inter-company information sharing system according to an embodiment of the present invention.

FIG. 2 is a diagram illustrating an example of company data.

FIG. 3 is a diagram illustrating an example of a disclosure permission filter table.

FIG. 4 is a diagram illustrating an operation example of business category data.

FIG. 12 is a diagram illustrating an example of an abstraction processing table.

FIG. 13 is a diagram illustrating another example of access control.

DESCRIPTION OF EMBODIMENT

Figures 5, 6, 7, 8:
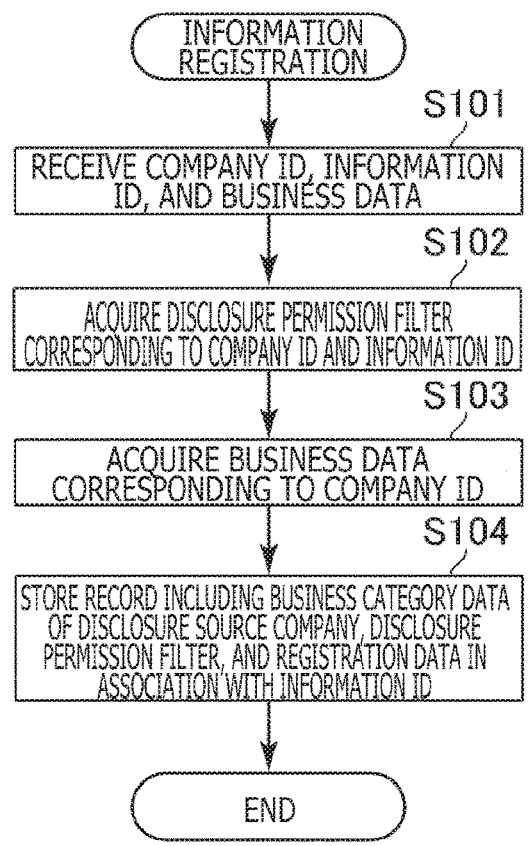
FIG. 5 is a diagram illustrating an operation example of the business category data.
FIG. 6 is a diagram illustrating an operation example of a disclosure permission filter.
FIG. 7 is a diagram illustrating an operation example of the disclosure permission filter.
FIG. 8 is a flowchart illustrating information registration processing by the inter-company information sharing system.

Hereinafter, an embodiment of the present invention will be described in detail on the basis of the drawings.

FIG. 1 is the entire configuration diagram of an information system including an inter-company information sharing system according to an embodiment of the present invention. In the information system illustrated in the figure, to an information communication network 16 such as the Internet, an inter-company information sharing system 10, a plurality of company computers 12, and a plurality of intra-company business management system 14 are connected.

The inter-company information sharing system 10 according to the present embodiment is used by a plurality of companies that perform business jointly. For example, in the business in which various electronic components are assembled to manufacture electronic equipment and it is transported to a point of sale, one or a plurality of companies that manufacture the electronic components, one or a plurality of companies that transport the manufactured electronic components to an assembling factory of the electronic equipment, one or a plurality of companies that assemble the electronic equipment from the electronic components, and one or a plurality of companies that transport the assembled electronic equipment to the point of sale get involved. The inter-company information sharing system 10 is used by the plurality of companies and business data such as planned values or actual values of business in charge is shared among the above companies.

The company computer 12 is a computer such as personal computers that are each installed within separate companies. Further, the company computer 12 accesses the inter-company information sharing system 10 through the information communication network 16 and browses necessary business data.

The intra-company business management system 14 is an information system each managed by separate companies and includes at least one server 14a and a plurality of terminals 14b. The server 14a includes a central processing unit (CPU) and a storage apparatus such as a semiconductor memory and is capable of managing various pieces of business information within the company. The terminals 14b are various stationary or portable computers. In the intra-company business management system 14, the business data input from each terminal 14b is accumulated in the server 14a. Note that a part or all of servers 14a may be constructed by a so-called cloud system.

For example, in a case where the intra-company business management system 14 is managed by a company belonging to manufacturing services, the terminal 14b may be a controller connected to a robot that is arranged in a factory line. From the terminal 14b that is a controller of the robot that takes on manufacturing of products, the business data of operating states or the like of the robot is transmitted to the server 14a as needed. Further, in a case where the intra-company business management system 14 is managed by a company belonging to transportation services, the terminal 14b may be a communication terminal that is transported by a person in charge associated with transportation, such as a truck driver. When the person in charge associated with transportation inputs the business data of transportation states or the like by using the terminal 14b, the business data thereof is transmitted to the server 14a immediately. Various pieces of business data collected at the server 14a are transmitted to the inter-company information sharing system 14 through the information communication network 16.

Typically, a company that uses the inter-company information sharing system 10 manages at least one intra-company business management system 14 and at least one company computer 12. Then, the business data of the same company is uploaded to the inter-company information sharing system 10 by using the intra-company business management system 14 for registration. Further, if necessary, the intra-company business management system 14 accesses the inter-company information sharing system 10 by using the company computer 12. Further, the intra-company business management system 14 browses the business data registered by its own company or the other companies, or abstracted business data obtained by performing abstraction processing such as adding-up on the business data (afterward, the above will be described in detail).

The inter-company information sharing system 10 implements sharing of the business data among the companies and includes at least one server 10a and at least one database 10b. A part or all of the servers 10a may be constructed by the so-called cloud system. Similarly, even a part or all of the databases 10b may be constructed by the co-called cloud system. When the business data is received from the intra-company business management system 14 in a certain company, the server 10a of the inter-company information sharing system 10 registers the business data in the database 10b. Further, when the server 10a is accessed from the company computer 12 of another company, the server 10a transmits the business data registered in the database 10b to the company computer 12. At this time, the inter-company information sharing system 10 performs appropriate access control in accordance with a relationship between a company that registers the business data in the inter-company information sharing system 10 and a company that browses the business data.

To implement such access control, various pieces of data are stored in advance in the database 10b. FIG. 2 is a diagram illustrating an example of the company data that is a type of the above data. As illustrated in the same figure, the company data includes a company identification (ID), business category data, and a disclosure permission filter table. The company ID is information for identifying each company. In the present embodiment, the company ID is a binary number having the same number of digits as the number of companies that use at least the inter-company information sharing system 10, and each company is allocated to each digit (see FIGS. 6 and 7). That is, in each company ID, 1 is set to any one of the digits and 0 is set to the other digits.

The business category data is data indicating a business category of a company and includes information of whether or not the company corresponds to each of a plurality of business types. For example, the business category data may be set to four-bit data and a different business type may be allocated to each bit (see FIGS. 4 and 5). In this case, 1 is set to a bit corresponding to the business type to which the company belongs and 0 is set to a bit corresponding to the business type to which the company does not belong. In a case where a single company belongs to a plurality of business types, 1 is set to a plurality of bits. For example, in a case where the business type data is set to four-bit data, the transportation services, electronics manufacturing services (EMS), selling services of electronic components, and the manufacturing services of electronic components may be allocated to a first bit, a second bit, a third bit, and a fourth bit, respectively. In this case, the business category data of a company that performs only the EMS is "0010" and the business category data of a company that performs manufacturing services and selling services of electronic components is "1100."

The business category data is used for the access control of the business data. Specifically, the business category data of a company (disclosure source) in which the business data is registered in the inter-company information sharing system 10 and that of a company (disclosure destination) in which the business data is browsed are subjected to an AND operation. When an operation result is zero, both of the companies do not perform the same business type and permit information disclosure. By contrast, when the operation result is non-zero, both of the companies perform the same business type and do not permit the information disclosure. For example, in a case where the business category data of the disclosure source company is "0011" and the business category data of a disclosure destination company is "0100" as illustrated in FIG. 4, a result of the AND operation of the business category data is "0000" and the disclosure is permitted. By contrast, in a case where the business category data of the disclosure destination company is "1001" as illustrated in FIG. 5, a result of the AND operation of the business category data is "0001" and the disclosure is not permitted.

The disclosure permission filter table included in the company data illustrated in FIG. 2 is set in each company ID in advance and is exemplified in FIG. 3. As illustrated in the same figure, the disclosure permission filter table includes a plurality of disclosure permission filters. An information ID is associated with each disclosure permission filter. The information ID identifies a type of the business data. In the present embodiment, examples of a type of the business data recorded in the database 10b include shipping states of electronic components, transportation states of electronic components, assembling states of electronic equipment, transportation states of electronic equipment, and the like. The information ID indicates that the business data corresponds to any of the above types. The disclosure permission filter is information indicating that the business data of a type specified by the information ID may be disclosed to any company. Here, the disclosure permission filter has a binary number of the same number of digits as that of the company ID. Further, 1 is set to a digit corresponding to a company that may be disclosed and 0 is set to the other digits.

Even the disclosure permission filter is used for the access control of the business data. Specifically, the disclosure permission filter of the disclosure source company and the company ID of the disclosure destination company are subjected to the AND operation. When the operation result is non-zero, even if the disclosure destination company is not permitted to be disclosed by the business category data, the disclosure may be specially permitted. As illustrated in FIG. 6, for example, the disclosure permission filter of a certain information ID of the disclosure source company is "000000001100" and the company ID of the disclosure destination company is "000000000100." In this case, a result of the AND operation is "000000000100" and the disclosure is permitted because the operation result is non-zero. By contrast, as illustrated in FIG. 7, the company ID of the disclosure destination company is "000000010000." In this case, a result of the AND operation is "000000000000" and the disclosure is not permitted because the operation result is zero.

Figure 9:
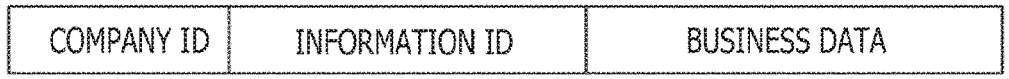
FIG. 9 is a diagram illustrating an example of an information registration request.

Here, the processes of the server 10a regarding the registration and disclosure of the business data in the inter-company information sharing system 10 will be described. FIG. 8 is a flowchart illustrating information registration processing of the business data by the server 10a. The processes illustrated in the same figure are implemented by executing a registration program in the server 10a. In the information registration processing, an information registration request is received from the server 14a of the disclosure source company (S101). As illustrated in FIG. 9, the information registration request includes the company ID, the information ID, and the business data to be registered. When such an information registration request is received from the server 14a, the server 10a accesses the disclosure permission filter table corresponding to the company ID included in the information registration request (see FIGS. 2 and 3) and acquires the disclosure permission filter corresponding to the information ID included in the same information registration request (S102). Further, the server 10a accesses the company data corresponding to the company ID included in the information registration request (see FIG. 2) and acquires the business category data corresponding to the company ID (S103). Then, as illustrated in FIG. 9, a record including the business category data of the disclosure source company acquired in S103, the disclosure permission filter acquired in S102, and the business data received in S101 is associated with the information ID received in S101 and is registered in the database 10b. In the above processes, the business data is associated with each information ID and is accumulated in the database 10b.

Figure 10:
FIG. 10 is a diagram illustrating an example of a record to be registered in a database.
Figure 11:
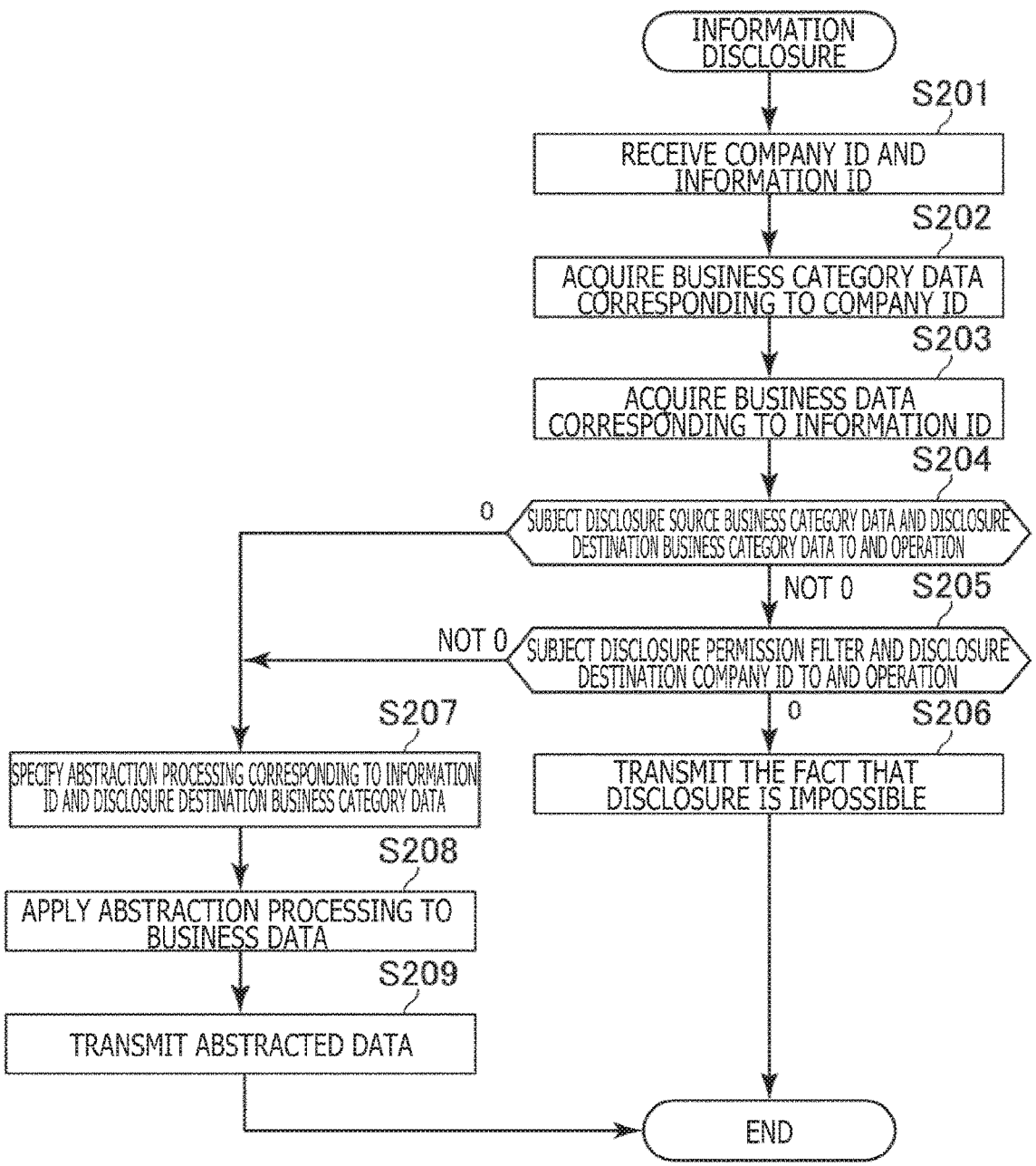
FIG. 11 is a flowchart illustrating information disclosure processing by the inter-company information sharing system.

By contrast, FIG. 11 is a flowchart illustrating disclosure processing of the business data by the server 10a. The processes illustrated in the same figure are implemented by executing the information disclosure program in the server 10a. In the information disclosure processing, the server 10a first receives the information disclosure request from the business computer 12 of the disclosure destination company (S201). The information disclosure request includes the company ID of the disclosure destination company and the information ID of the business data applying for the disclosure. Next, the server 10a accesses the company data (see FIG. 2) and acquires the business category data corresponding to the received company ID (S202). Further, the server 10a reads out one or a plurality of records (see FIG. 10) including the business data associated with the received information ID from the database 10b (S203). Then, the business category data of the disclosure destination company acquired in S202 and the business category data of the disclosure source company included in the record acquired in S203 are subjected to the AND operation (S204).

If the operation result is not zero in S204, the company ID received in S201 and the disclosure permission filter included in the record acquired in S203 are further subjected to the AND operation (S205). If the operation result is zero in S205, the server 10a sends back the fact that the disclosure is impossible to the company computer 12 of the disclosure destination company (S206).

If the operation result is zero in S204 and if the operation result is non-zero in S205, the server 10a refers to an abstraction processing table illustrated in FIG. 12 (S207). In the abstraction processing table, the information ID, the business category data of the disclosure destination company, and the identification information of the abstraction processing are associated with each other. The abstraction processing is processing for reducing an information amount of the business data. The abstraction processing is processing for reducing the information amount of the business data and is processing, etc. for calculating a statistic (may be an average value, a total value, or a count value for a certain period) of plural pieces of business data corresponding to the partially eliminated business data, a part or all of high-order conceptualization, and the information ID. For example, in a case where latitude and longitude that are geographic data are included in the business data, the abstraction processing may be processing for converting the latitude and the longitude into a nation name, prefecture name, or state name corresponding to the latitude and the longitude. Further, actual values or planned values of manufacturing or shipping of electronic equipment or electronic components are included in the plurality of business data corresponding to the information ID. In this case, the abstraction processing may be processing for calculating a total value of those values for a fixed period of time or processing for calculating values obtained by tabulating those values for each type of equipment or components. Further, in a case where a specific value is included in the business data, the abstraction processing may be processing for converting the specific value into a value range (e.g., "greater than or equal to 100 and smaller than 200" or the like). On the basis of the abstraction processing table, in a case where a certain type of business data is disclosed to a company of a certain business category, it can be determined that any abstraction processing ought to be applied to the business data.

In S207, the abstraction processing corresponding to the information ID received in S201 and corresponding to the business category data of the disclosure destination company acquired in S202 is specified in reference to the abstraction processing table illustrated in FIG. 12 (S207). Then, the abstraction processing specified in S208 is performed on the business data acquired in S203 (S208) and the abstracted business data is sent back to the company computer 12 of the disclosure destination company (S209).

According to the inter-company information sharing system 10 described above, the access control appropriate for the business data can be implemented in accordance with the relationship between the disclosure source company and disclosure destination company of the business data. At this time, as illustrated in FIG. 10, the business category data of the disclosure source company and the disclosure permission filter indicating the company in which the business data included in the record may be disclosed are included in the record registered in the database 10b. Further, it can be determined whether or not the business data may be disclosed in a high speed, through a bit operation using the above data.

Further, as illustrated in FIG. 3, because the disclosure permission filter is set to each information ID, it can be sensitively specified that any type of the business data may be disclosed to any company. Further, as illustrated in FIG. 12, according to the present embodiment, the abstraction processing can be specified correspondingly to the information ID and the business category data of the disclosure destination company. Therefore, the required and sufficient abstraction processing is performed to thereby disclose the business data. It is expected that by performing required and sufficient sharing, sharing of the business data is persuaded among companies.

Note that the present invention is not limited to the embodiment and various modifications can be performed. Further, even such a modification belongs to a scope of the present invention. For example, the access control of the business data is implemented in accordance with the relationship between the disclosure source company and the disclosure destination company. For this purpose, the present invention is not limited to the method according to the embodiment and, for example, a definition of a directed graph as exemplified in FIG. 13 may be used.

Further, in a flowchart illustrated in FIG. 11, it is determined whether or not the business data is disclosed, by using both the business category data and the disclosure permission filter. Specifically, if it is determined by using the business category data that the business categories are not overlapped, the disclosure processing is performed immediately. By contrast, only if it is determined by using the business category data that the business categories are overlapped, it is determined whether the business data is disclosed, by using the disclosure permission filter exceptionally. The process permits the disclosure processing speed of the business data to be increased.

By contrast, there may be used a configuration in which it is determined whether or not the business data is disclosed, by using only one of the business category data and the disclosure permission filter. In the flowchart illustrated in FIG. 11, for example, one step of S204 and S205 may be omitted. In a case where S204 is omitted, it is determined whether or not the business data is disclosed, by using only the disclosure permission filter. Further, the business data is disclosed to only the company in which the disclosure is permitted by using the disclosure permission filter regardless of the business category. By doing so, whether or not the business data is disclosed can be specified particularly in unit of the company. By contrast, in a case where S205 is omitted, it is determined by using only the business category data whether or not the business data is disclosed. By doing so, only through the overlapping of the business category, it is determined whether or not the business data is disclosed, and therefore the disclosure processing speed of the business data can be further increased.

The invention claimed is:

1. An inter-company information sharing and access control system in which a communication connection is made with a plurality of computers individually corresponding to a plurality of companies, comprising:
    a processor configured to:
        receive an information disclosure request from at least one of the computers which thereby becomes a disclosure request computer;
        receive an information registration request from at least one the computers which thereby becomes a registration request computer;
    a data storage device for storing information regarding the information registration request; and a disclosure controller for controlling a disclosure of the information stored in the data storage device on a basis of information regarding the company corresponding to the registration request computer and the information regarding the company corresponding to the disclosure request computer, wherein information regarding a source company corresponding to the registration request computer and information regarding a requesting company corresponding to the disclosure request computer includes business category data in the form of binary data which indicates whether or not the source company and requesting company correspond to each of a plurality of business types, wherein a different business type is allocated to each bit of the binary data, and wherein an AND operation is performed on the binary data of the source company and requesting company to determine whether there is a business type overlap between the source company and requesting company, and wherein when there is no overlap as indicated by the results of the AND operation, disclosure processing is performed to determine whether to provide the requested disclosure information to the disclosure request computer.

2. The inter-company information sharing system according to claim 1, wherein the disclosure controller controls the disclosure of the information on a basis of business category data of the company corresponding to the registration request computer and the business category data of the company corresponding to the disclosure request computer.

3. The inter-company information sharing system according to claim 1, wherein the disclosure controller controls the information disclosure on a basis of data for specifying an object company of the information disclosure for the company corresponding to the registration request computer and data for specifying the company corresponding to the disclosure request computer.

4. The inter-company information sharing system according to claim 1, wherein the data for specifying the object company of the information disclosure is set in advance in each type of the information.

5. The inter-company information sharing system according to claim 1, wherein the disclosure controller transmits, to the disclosure request computer, the information abstracted by a mode corresponding to a type of the information and the business category data of the company corresponding to the disclosure request computer.

6. The inter-company information sharing system according to claim 1, further comprising:
the plurality of computers, wherein
each of the computers includes means for transmitting the information registration request including data for identifying the company corresponding to the registration request computer and data for identifying the type of the information to be registered.

7. The inter-company information sharing system according to claim 6, wherein each of the computers further includes means for transmitting the information disclosure request including the data for identifying the company corresponding to the disclosure request computer and the data for identifying the type of the information requested for disclosure.

8. An inter-company information sharing method among a plurality of computers individually corresponding to a plurality of companies, comprising:

receiving an information disclosure request from at least one of the computers which thereby becomes a disclosure request computer;

receiving an information registration request from at least one of the computers which thereby becomes a registration request computer;

storing information regarding the information registration request in a data storage device; and controlling a disclosure of the information stored in the data storage device on a basis of information regarding the company corresponding to the registration request computer and the information regarding the company corresponding to the disclosure request computer, wherein information regarding a source company corresponding to the registration request computer and information regarding a requesting company corresponding to the disclosure request computer includes business category data in the form of binary data which indicates whether or not the source company and requesting company correspond to each of a plurality of business types, wherein a different business type is allocated to each bit of the binary data, and wherein an AND operation is performed on the binary data of the source company and requesting company to determine whether there is a business type overlap between the source company and requesting company, and wherein when there is no overlap as indicated by the results of the AND operation, disclosure processing is performed to determine whether to provide the requested disclosure information to the disclosure request computer.

9. The inter-company information sharing method according to claim 8, further comprising: transmitting the information registration request including data for identifying the company corresponding to the registration request computer and data for identifying a type of the information to be registered.

10. The inter-company information sharing method according to claim 8, further comprising: transmitting the information disclosure request including the data for identifying the company corresponding to the disclosure request computer and the data for identifying the type of the information requested for disclosure.

11. The inter-company information sharing system according to claim 1, wherein the company ID is a binary number having the same number of digits as the number of companies that use the inter-company information sharing system, and each company is allocated to each bit of the binary number.

12. The inter-company information sharing system according to claim 1, wherein the business category is a binary number that includes information of whether the company corresponds to at least one of a plurality of business types, such that a different business type is allocated to each bit of the binary number.

13. The inter-company information sharing system according to claim 1, wherein the disclosure permission filter table comprises at least one disclosure permission filter and an information ID associated with each disclosure permission filter.

14. The inter-company information sharing system according to claim 13, wherein the information ID is a binary number that identifies a type of business data that was registered as a result of the information registration request.

15. The inter-company information sharing system according to claim 14, wherein the disclosure permission filter is a binary number having the same number of digits as the company ID and indicates whether the business data of the type specified by the information ID may be disclosed to the company corresponding to the disclosure request computer.

16. The inter-company information sharing system according to claim 15, wherein the disclosure permission filter of the registration request computer and the company ID of the disclosure request computer are subjected to the AND operation which determines whether disclosure may be provided to the company corresponding to the disclosure request computer.

17. The inter-company information sharing system according to claim 1, wherein when the AND operation indicates there is no overlap in business type a further AND operation is performed on a company ID of the requesting company and a disclosure permission filter and if the result of the further AND operation is zero, disclosure is not permitted.

* * * * *